United States Patent
Batey

Patent Number: 5,097,512
Date of Patent: Mar. 17, 1992

[54] TRANSDUCER TESTING

[75] Inventor: Keith G. Batey, North Queensferry, Great Britain

[73] Assignee: GEC-Marconi Limited, England

[21] Appl. No.: 551,282

[22] Filed: Jul. 12, 1990

[30] Foreign Application Priority Data

Oct. 30, 1989 [GB] United Kingdom ............... 8924393

[51] Int. Cl.⁵ .................. H04R 29/00; G01C 17/38; G01C 3/08; H04B 17/00
[52] U.S. Cl. .................. 381/58; 73/1 DV; 73/645; 367/13
[58] Field of Search .................. 381/58, 114, 173; 367/13; 73/1 DV, 645; 324/727

[56] References Cited

U.S. PATENT DOCUMENTS

| | | | |
|---|---|---|---|
| 3,365,667 | 3/1963 | Deutsch | 455/67 |
| 3,439,128 | 5/1966 | Sobel | 381/173 |
| 4,205,394 | 5/1980 | Pickens | 367/13 |
| 4,375,679 | 3/1983 | Park, Jr. et al. | 367/13 |
| 4,429,190 | 1/1984 | Stockbridge | 381/173 |
| 4,535,205 | 8/1985 | Ravinet | 381/114 |
| 4,595,853 | 6/1986 | Nagatsuma | 324/727 |
| 4,959,992 | 10/1990 | Gentles | 73/1 DV |

*Primary Examiner*—James L. Dwyer
*Assistant Examiner*—Jack Chiang
*Attorney, Agent, or Firm*—Kirschstein, Ottinger, Israel & Schiffmiller

[57] ABSTRACT

A phased array of transducers is placed in contact with a block (15) of sound absorbent material surrounded by a housing (12) in such a manner that the block and housing together define an effectively anechoic chamber. A plurality of transducer elements (20) mounted within the block (15) are driven by variable phased drive electronics so as to simulate acoustic plane waves. The receiver field sensitivity of the array is measured. Alternatively the transducers under test may be driven and the transducer elements (20) are used to measure the amplitude and phase of the acoustic wave emanating from the array under test.

8 Claims, 3 Drawing Sheets

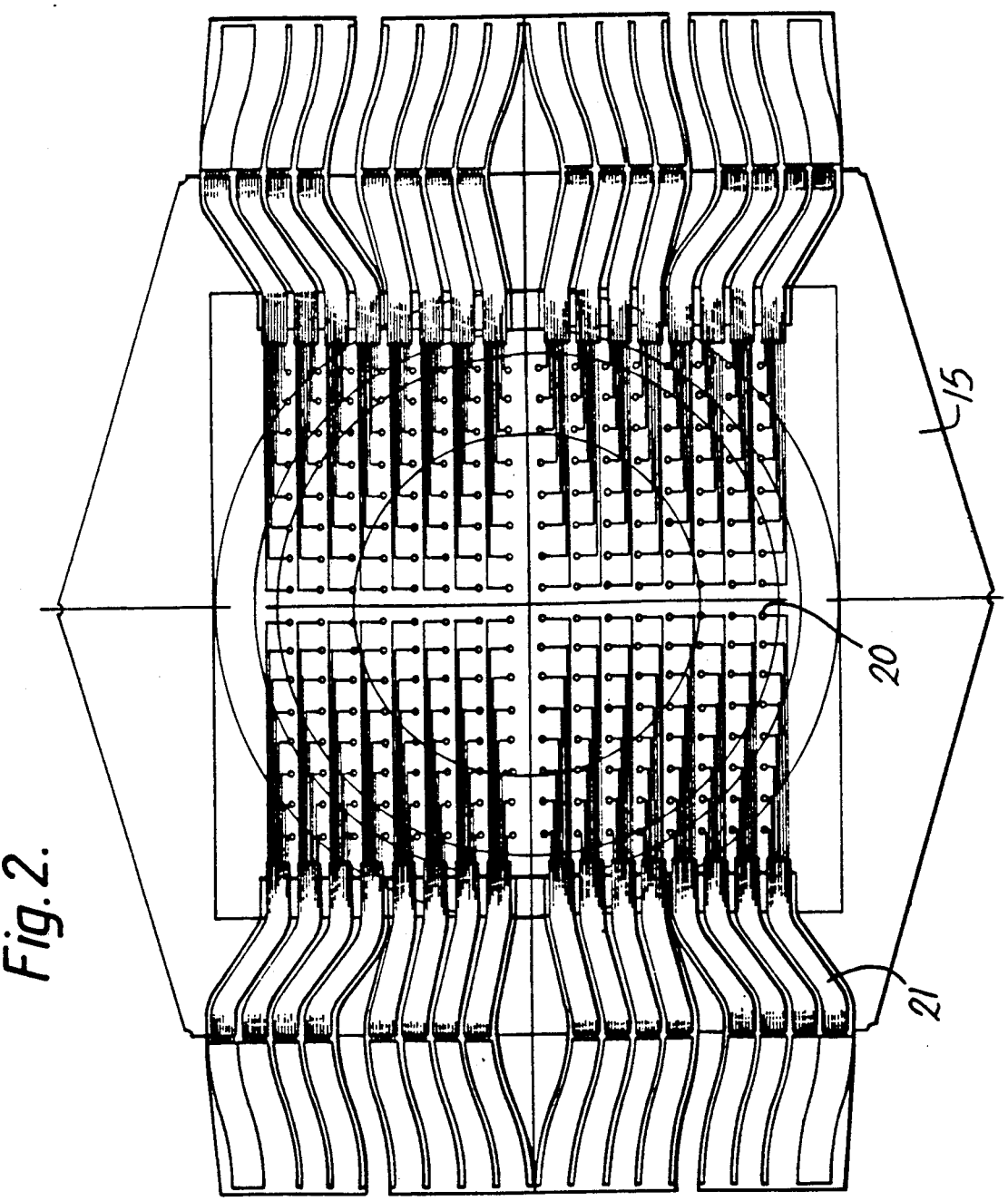

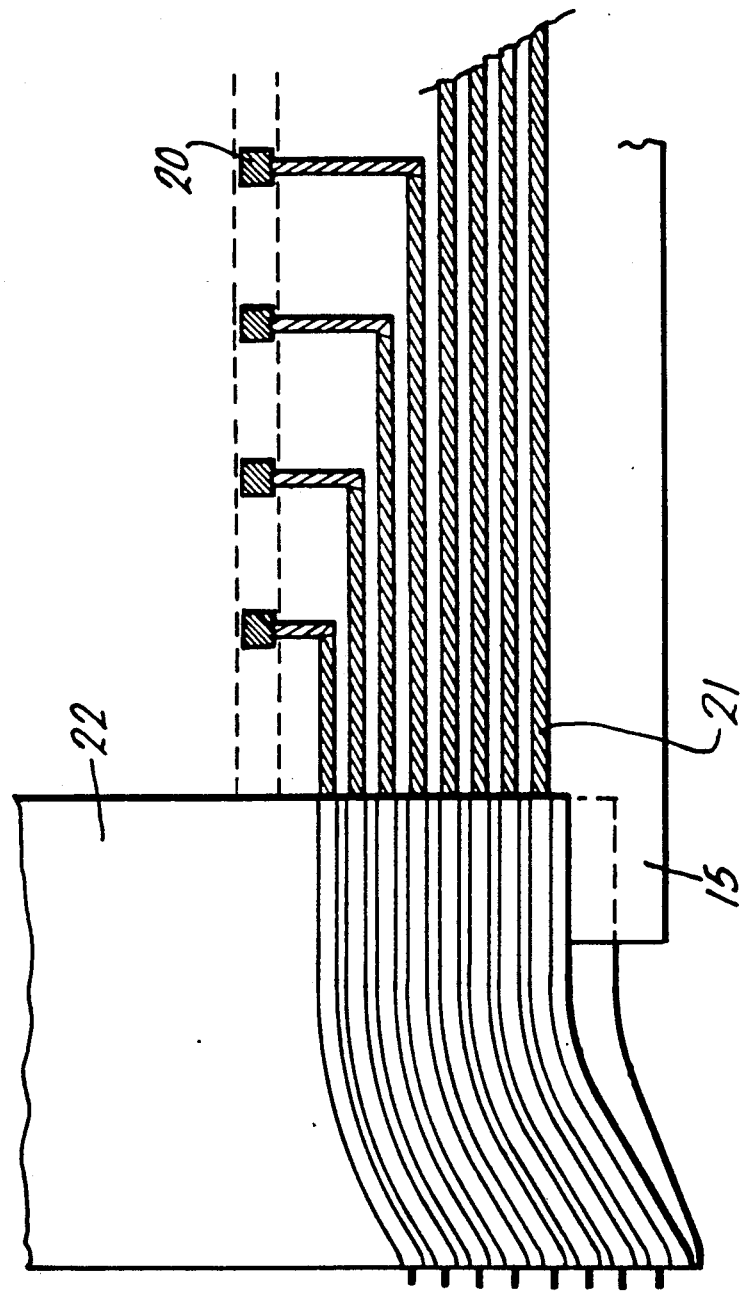

TRANSDUCER TESTING

BACKGROUND OF THE INVENTION

1. Field of the Invention

The present invention is concerned with the testing of phased arrays of transducers, and in particular, though not exclusively, ultrasonic transducers.

2. Description of Related Art

Phased arrays of transducers are frequently used in underwater applications. The usual method of testing such arrays involves immersing the array into a large volume of water, typically large water tanks or open water test facilities such as reservoirs. The test facility must also provide a mechanical means of scanning the far field response of the test subject. Testing is both time-consuming, unwieldy and expensive.

One method which has been proposed for overcoming the problems of testing transducers as just set out utilizes acoustic loading rods which are dimensioned to simulate the acoustic impedance that a transducer would experience in actual operation.

This approach also has problems when the faces of the transducers to be tested are coated in such a way that there can be no direct contact between the active face of the transducer and the loading rod.

SUMMARY OF THE INVENTION

The present invention has for an object to provide a method and apparatus for testing phased arrays of transducers which alleviate the above disadvantages.

Accordingly from a first aspect the present invention consists in a method of testing a phased array of transducers comprising the steps of placing the array into contact with a block of sound absorbent material, driving a plurality of bi-directional transducers mounted within said block by variable phased drive electronics so as to simulate acoustic plane waves propagating towards the array under test, and measuring the receiver field sensitivity of the array.

This invention also includes the converse of the above operation in which the phased array to be tested is driven, and said plurality of bi-directional transducers in said block is used to measure the output of said phased array.

From a second aspect the invention comprises apparatus for testing a phased array of transducers comprising a block of material representing an acoustic load, a plurality of bi-directional transducers on said block, and connection means for connecting said bi-directional transducers to test equipment external to said block.

BRIEF DESCRIPTION OF THE DRAWINGS

In order that the present invention may be more readily understood, an embodiment thereof will now be described by way of example and with reference to the accompanying drawings, in which:

FIG. 2 shows one side of the transducer array of the apparatus of FIG. 1, FIG. 3 shows a detail of the edge connections of the transducers of FIG. 2.

DETAILED DESCRIPTION OF THE PREFERRED EMBODIMENT

Figure 1:
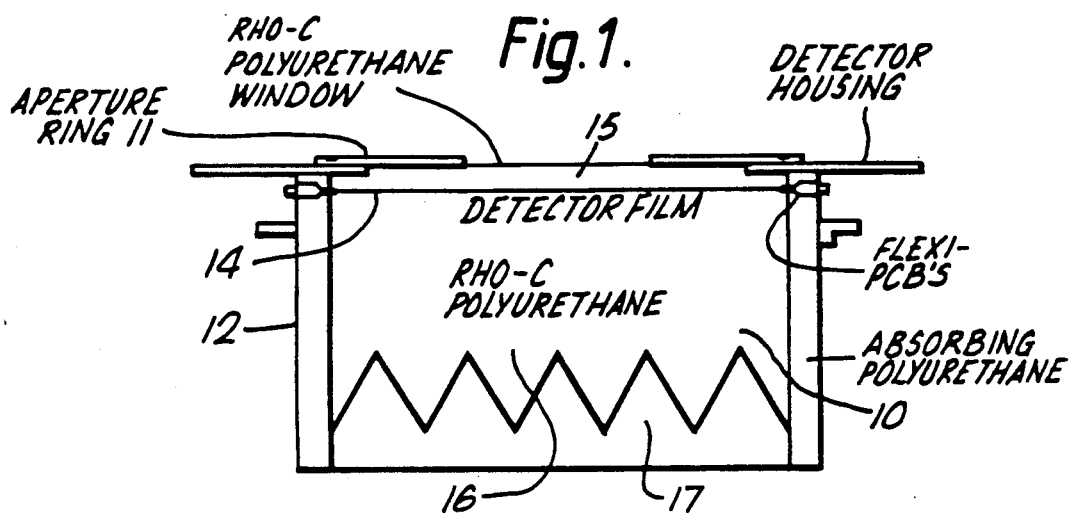
FIG. 1 is a side section through test apparatus according to the present invention.

Referring now to FIG. 1 of the drawings this shows apparatus for testing phased arrays of transducers, and particularly piezo-electric transducers mounted as a "plane" array.

The apparatus shown in FIG. 1 comprises a main body 10 consisting of an outer housing or casing 12 formed in two flanged parts held together by bolts. An aperture ring 11 defines a window against which, in operation of the apparatus, arrays of transducers to be tested can be placed.

A detector film 14 is mounted within the housing 10 by being bonded to a block 15 of RHO-C polyurethane. A very important feature of the material of block 15 is that it has very low levels of acoustic absorption. The bulk of the remainder of the cavity of container 10 is also filled with RHO-C polyurethane as is indicated at 16. The internal walls of the cavity are potted with another polyurethane material 17 which however has a high level of acoustic absorption. As can be seen in FIG. 1 the material 17 has a saw-tooth cross section in order to reduce the possibility of acoustic reflection. Because of their arrangement the interior of casing 10 effectively acts as an efficient anechoic chamber.

The detector film 14 is made from a 50 μm thick film of a copolymer piezo plastic.

A geometric array of bi-directional transducer elements are silk screen printed onto the film 14 using silver ink. On one side of film 14 is printed a ground plane and onto the other is printed the detecting array. Active transducer areas are formed at the points of overlap between the ground plane and the detector printing.

The nature of the detector array mounted on film 14 can best be appreciated from the plan view of FIG. 2. In this embodiment there are 256 similar detector elements one of which is labelled 20. Conductive leads generally indicated at are taken to the edge of the polyurethane block 15.

The overall size of the complete array and the inter-element spacing will be chosen in accordance with the dimensions of the arrays under test and their operating frequency. However normally each element will have its major dimension substantially less than the wavelength of the array being tested. This is to ensure adequate definition although if the individual elements are too small sensitivity will be lost.

Electrical connections between the bi-directional transducer elements and external test equipment are made by connectors 21 mounted on the casing 10 with the connections between the printing on film 14 and the connectors 21 being made by flexible PCB's 22. These are bonded to film 14 by conductive adhesive tape. The use of flexible PCB's and adhesive tape is to reduce acoustic reflections from the connection interface to a minimum.

FIG. 3 of the drawings shows the piezo-film detector and one set of PCB's more clearly. In the manufacture of the array of detectors, as has been already described, the back planes and the detector arrays are printed on either side of the film 14. In order to make the necessary outer connections one edge of a PCB 22 is secured to the appropriate side of film 14 with the respective contacts overlying. This edge is then secured by adhesive tape. The PCB is then bent so that the contacts on its opposite edge engage the appropriate contact areas on the other side of the film 14. Once again adhesive tape is used.

The apparatus just described can be used either as a receiver tester or as a transmitter tester. In both modes of operation a "Near Field" measurement technique is used. An ultrasonic phased array to be tested is coupled to the input window 19 with a thin film of fluid such as a soap film.

When the transducer elements 20 are used as transmitters so that the apparatus is being used to test the recurring capabilities of a phased array of transducers a signal source is simulated by arranging for a phase-shifted drive to each transducer element 20.

Alternatively when used in a passive mode the array of transducer elements 20 are used to measure the amplitude and phase of the acoustic wave emanating from the array under test. A mathematical algorithm is then used to calculate the far field response of the phased array.

Figure 4:
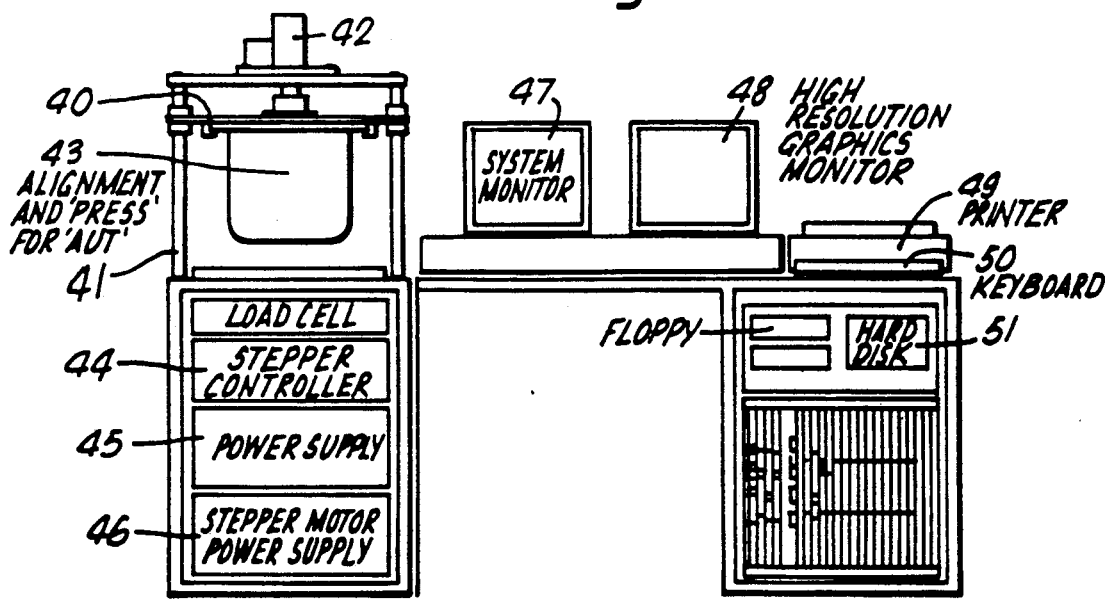
FIG. 4 shows a work station incorporating the apparatus of FIGS. 1 to 3.

FIG. 4 of the drawings shows a complete work station incorporating the present invention. The transducer array and associated anechoic casing is mounted beneath a crosspiece 40 which can be slid up and down on pillars 41 under the control of a stepper motor 42. The crosspiece 40 carries mountings so that a transducer array to be tested can be held vertically with the active faces of the transducers to be tested facing downwardly. Such an array to be tested is indicated at 43.

The work station also includes stepper controller circuitry housed at 44, a main power supply 45 and a stepper motor power supply 46. A systems monitor is shown at 47 along with a high resolution graphics monitor at 48. The work station also includes a printer 49 and keyboard 50 associated with a computer 51 having floppy and hard disc drives.

One purpose of FIG. 4 is to show how compact apparatus according to the present invention can be, particularly when compared with known test equipment.

I claim:

1. Apparatus for testing a phased array of transducers comprising: a block of sound absorbent material acting as an acoustic load; a housing surrounding said block; a window in an external face of said housing against which, in operation of the apparatus, an array of transducers to be tested is placed; a plurality of bidirectional transducer elements mounted on said block and lying in a plane generally parallel to said window; and connection means for connecting said transducer elements to test equipment external of said block, whereby said transducer elements can operate both to direct acoustic energy through said window and receive acoustic energy transmitted from external of the block.

2. Apparatus as claimed in claim 1, wherein said transducer elements are mounted on a flexible film.

3. Apparatus as claimed in claim 2, wherein said flexible film is a film of piezo-electric copolymer.

4. Apparatus as claimed in claim 3, wherein the transducer elements are formed by ground planes printed on one side of said film, and transducer element arrays and associated conductive tracks printed on the other side of said film, said connection means including flexible printed circuit boards connecting said ground planes and said printed transducer elements to external connections.

5. Apparatus as claimed in claim 4, wherein the flexible printed circuit boards are secured to the appropriate tracks on said film by flexible adhesive tape.

6. Apparatus as claimed in claim 1, wherein the block is of a polyurethane material of low acoustic absorption.

7. Apparatus as claimed in claim 6, wherein the iow acoustic absorption material is at least partially enclosed by a material of high acoustic absorptivity.

8. A method of testing a phased array of transducers comprising the steps of: placing the array under test into contact with a window in an external face of a housing that surrounds a block of sound absorbent material that acts as an acoustic load, the block and the housing together defining an effectively anechoic chamber; mounting a plurality of bidirectional transducer elements on the block in a plane generally parallel to the window; connecting the transducer elements to test equipment external of the block; operating the transducer elements as transmitters during a transmit mode, and as receivers during a receive mode; and measuring reception parameters of the array under test during the transmit mode, and transmission parameters of the array under test during the receive mode.

* * * * *